United States Patent
Nakamura et al.

(10) Patent No.: US 7,329,694 B2
(45) Date of Patent: Feb. 12, 2008

(54) OCULAR LENS

(75) Inventors: Masataka Nakamura, Otsu (JP);
Kazuhiko Fujisawa, Otsu (JP); Naoki Shimoyama, Otsu (JP); Mitsuru Yokota, Otsu (JP)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/488,089

(22) PCT Filed: Aug. 28, 2001

(86) PCT No.: PCT/JP01/07390

§ 371 (c)(1),
(2), (4) Date: Feb. 25, 2004

(87) PCT Pub. No.: WO03/021337

PCT Pub. Date: Mar. 13, 2003

(65) Prior Publication Data

US 2004/0201820 A1    Oct. 14, 2004

(51) Int. Cl.
*G02B 1/04* (2006.01)
(52) U.S. Cl. .................................................. 523/106
(58) Field of Classification Search ............. 523/106
See application file for complete search history.

(56) References Cited

FOREIGN PATENT DOCUMENTS

| GB | 1494641 | | 12/1977 |
|---|---|---|---|
| WO | WO 92/07013 | * | 4/1992 |

* cited by examiner

*Primary Examiner*—Edward J. Cain

(57) ABSTRACT

This invention provides an ophthalmic lens of high tensile elongation (i.e., that does not break easily). It is an ophthalmic lens comprising, as a polymerization component, monomers represented by formula (a) below:

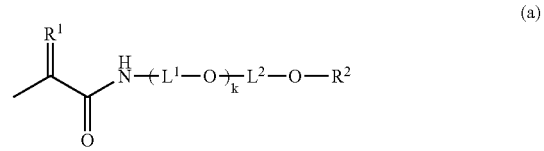

(a)

wherein, in formula (a), $R^1$ is H or a methyl group; $R^2$ is a group that is selected from alkyl groups with 1 to 8 carbon atoms, aralkyl groups with 7 to 12 carbon atoms and aryl groups with 6 to 10 carbon atoms; $L^1$ is a substituent that is selected from ethylene groups, 1,2-propylene groups, 1,3-propylene groups and 1,4-butylene groups; and $L^2$ is a substituent that is selected from methylene groups, ethylene groups, 1,2-propylene groups, 1,3-propylene groups and 1,4-butylene groups.

12 Claims, No Drawings

OCULAR LENS

This is a filing under 35 U.S.C. 371 of PCT/JP01/07390 filed on Aug. 28, 2001.

TECHNICAL FIELD

This invention relates to ophthalmic lenses such as contact lenses, intraocular lenses and artificial corneas, and, of these, is most suitable for contact lenses.

PRIOR ART

Siloxanyl monomers such as 3-methacryloxypropyltris (trimethylsiloxy)silane are used as monomers for ophthalmic lenses (for example, U.S. Pat. No. 3,808,178). Although ophthalmic lenses comprised of these siloxanyl monomers have the advantage of being of high oxygen permeability, they are strongly hydrophobic, for which reason it is difficult to use them for ophthalmic lenses and for contact lenses in particular.

Accordingly, when these siloxanyl monomers are used, hydrophilic properties are generally conferred on the ophthalmic lenses by copolymerizing various hydrophilic monomers (for example, N,N-dimethylacrylamide, N-vinyl pyrrolidone and 2-hydroxyethylmethacrylate). However, when they are copolymerized with such hydrophilic monomers, there are instances in which there are the drawbacks that the ophthalmic lenses have little tensile elongation (i.e., they break easily).

DISCLOSURE OF THE INVENTION

This invention has the objective of providing ophthalmic lenses of high tensile elongation (i.e., they do not break readily).

In order to achieve this objective, the ophthalmic lens of this invention has the following structure.

An ophthalmic lens comprising, as a polymerization component, monomers represented by formula (a) below:

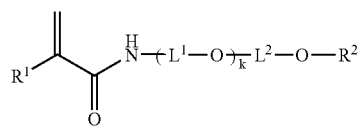

wherein, in formula (a), $R^1$ is H or a methyl group; $R^2$ is a group that is selected from alkyl groups with 1 to 8 carbon atoms, aralkyl groups with 7 to 12 carbon atoms and aryl groups with 6 to 10 carbon atoms; k is an integer of 0 to 2; $L^1$ is a substituent that is selected from ethylene groups, 1,2-propylene groups, 1,3-propylene groups and 1,4-butylene groups; and $L^2$ is a substituent that is selected from methylene groups, ethylene groups, 1,2-propylene groups, 1,3-propylene groups and 1,4-butylene groups.

EMBODIMENT OF THE INVENTION

We shall now describe the embodiment of this invention. First, we shall describe the symbols in formula (a).

$R^1$ is H or a methyl group. However, H is preferable from the standpoint that monomers of high polymerizability can be obtained.

k is an integer of 0 to 2. However, 0 or 1 is preferable from the standpoint of ease of polymerization.

$L^1$ is a substituent that is selected from ethylene groups, 1,2-propylene groups, 1,3-propylene groups and 1,4-butylene groups. However, ethylene groups are the most desirable from the standpoint that high hydrophilic properties can be obtained.

$L^2$ is a substituent that is selected from methylene groups, ethylene groups, 1,2-propylene groups, 1,3-propylene groups and 1,4-butylene groups. However, methylene groups, ethylene groups and 1,3-propylene groups are preferable from the standpoint of ease of synthesis and that high hydrophilic properties are obtained.

Particularly desirable examples of the monomers represented by formula (a) include N-methoxymethylacrylamide, N-ethoxymethylacrylamide, N-propoxymethylacrylamide, N-isopropoxymethylacrylamide, N-butoxymethylacrylamide, N-methoxymethylmethacrylamide, N-ethoxymethylmethacrylamide, N-propoxymethylmethacrylamide, N-isopropoxymethylmethacrylamide, N-butoxymethylmethacrylamide, N-(2-methoxyethyl)acrylamide, N-(2-ethoxyethyl)acrylamide, N-(2-propoxyethyl) acrylamide, N-(2-isopropoxyethyl)acrylamide, N-(2-butoxyethyl)acrylamide, N-(2-methoxyethyl)methacrylamide, N-(2-ethoxyethyl)methacrylamide, N-(2-propoxyethyl) methacrylamide, N-(2-isopropoxyethyl)methacrylamide, N-(2-butoxyethyl)methacrylamide, N-(3-methoxypropyl) acrylamide, N-(3-ethoxypropyl)acrylamide, N-(3-propoxypropyl)acrylamide, N-(3-isopropoxypropyl)acrylamide, N-(3-butoxypropyl)acrylamide, N-(3-methoxypropyl) methacrylamide, N-(3-ethoxypropyl)methacrylamide, N-(3-propoxypropyl)methacrylamide, N-(3-isopropoxypropyl) methacrylamide, N-(3-butoxypropyl)methacrylamide, N-[2-(2-methoxyethoxy)ethyl]acrylamide, N-[2-(2-ethoxyethoxy)ethyl]acrylamide, N-[2-(2-propoxyethoxy) ethyl]acrylamide, N-[2-(2-isopropoxyethoxy)ethyl] acrylamide, N-[2-(2-butoxyethoxy)ethyl]acrylamide, N-[2-(2-methoxyethoxy)ethyl]methacrylamide, N-[2-(2-ethoxyethoxy)ethyl]methacrylamide, N-[2-(2-propoxyethoxy)ethyl]methacrylamide, N-[2-(2-isopropoxyethoxy)ethyl]methacrylamide and N-[2-(2-butoxyethoxy)ethyl]methacrylamide.

The monomers represented by formula (a) can be manufactured, for example, by usual methods of manufacture of (meth)acrylamide as indicated below.

(1) Condensation reactions between amine compounds as represented by formula (b) and (meth)acrylic acid halides by dehydrohalogenation.

(2) Dehydration condensation reactions of amine compounds as represented by formula (b) and (meth)acrylic acids.

(3) Ester amide exchange reactions of amine compounds as represented by formula (b) and (meth)acrylate esters:

$$H_2N-(L^1-O)_k-L^2-O-R^2 \quad (b)$$

wherein, in formula (b), the symbols have the same significance as the symbols in formula (a).

The ophthalmic lenses of this invention can be obtained by polymerizing monomers of formula (a). In this case, the monomers of formula (a) can be polymerized individually or they can be copolymerized with other monomers. Several types of monomers of formula (a) and other monomers can be used at the same time.

There are no particular limitations on the copolymerization monomers when copolymerization with other monomers is performed as long as they are copolymerizable, and monomers having (meth)acryloyl groups, styryl groups, allyl groups, vinyl groups and other copolymerizable carbon-carbon unsaturated bonds can be used.

Several examples are presented below. However, they are not limited to them. They can include (meth)acrylic acid, itaconic acid, crotonic acid, cinnamic acid, vinyl benzoic acid; alkyl(meth)acrylates such as methyl(meth)acrylate and ethyl(meth)acrylate; polyfunctional(meth)acrylates such as polyalkylene glycol mono(meth)acrylate, polyalkylene glycol monoalkyl ether(meth)acrylate, polyalkyleneglycol bis(meth)acrylate, trimethylol propanetris(meth)acrylate, pentaerythritol tetrakis(meth)acrylate and siloxane macromers having carbon-carbon unsaturated bonds in both terminals; halogenated alkyl(meth)acrylates such as trifluoroethyl (meth)acrylate and hexafluoroisopropyl(meth)acrylate; hydroxyalkyl(meth)acrylates having hydroxyl groups such as 2-hydroxyethyl(meth)acrylate and 2,3-dihydroxypropyl (meth)acrylate; (meth)acrylamides such as N,N-dimethylacrylamide, N,N-diethylacrylamide, N,N-di-n-propylacrylamide, N,N-diisopropylacrylamide, N,N-di-n-butylacrylamide, N-acryloyl morpholine, N-acryloyl piperidine, N-acryloyl pyrrolidine and N-methyl(meth)acrylamide; aromatic vinyl monomers such as styrene, α-methylstyrene and vinyl pyridine; maleimides; heterocyclic vinyl monomers such as N-vinylpyrrolidone; and siloxanyl monomers. The prefix "siloxanyl" in this specification means "having siloxanyl groups." Consequently, the expression "silocanyl monomers" means "monomers that have siloxanyl groups." Further, the expression "siloxanyl group" in this specification means a group having at least one Si—O—Si bond.

In order to obtain high oxygen permeability in the ophthalmic lenses of this invention, it is desirable to copolymerize the monomers of formula (a) with siloxanyl monomers.

Desirable siloxanyl monomers include monomers represented by formula (B) below and siloxanyl styrene:

X-Z-L-A  (B)

wherein, in formula (B), A is a siloxanyl group; X is a polymerizable group having a carbon-carbon unsaturated bond; L is a divalent group with 1 to 10 carbon atoms; Z is a substituent selected from O, S and N—Y; and Y is a substituent that is selected from the group consisting of hydrogen, alkyl groups that may be substituted and aryl groups that may be substituted.

We shall now describe the symbols in formula (B).

In formula (B), A is a siloxanyl group. Preferred substituents as A are expressed by the following formula (A):

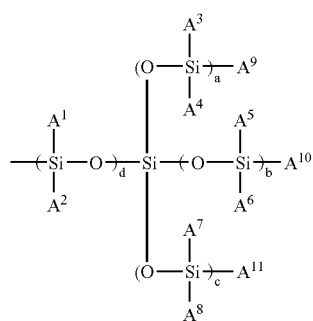

(A)

wherein, in formula (A), $A^1$ to $A^{11}$ are selected from hydrogen atoms, alkyl groups that may be substituted and aryl groups that may be substituted; d is an integer of 0 to 200; and a, b and c are, respectively and independently, integers of 0 to 20, excepting the case d=a=b=c=0.

In formula (A), $A^1$ to $A^{11}$ are selected from hydrogen atoms, alkyl groups that may be substituted and aryl groups that may be substituted. Specific examples can include hydrogen atoms; alkyl groups such as methyl groups, ethyl groups, propyl groups, isopropyl groups, butyl groups, isobutyl groups, sec-butyl groups, t-butyl groups, hexyl groups, cyclohexyl groups, 2-ethylhexyl groups and octyl groups; and aryl groups such as phenyl groups and naphthyl groups.

d is an integer of 0 to 200, preferably, of 0 to 50, and, more preferably, of 0 to 10. a, b and c are, respectively and independently, integers of 0 to 20, and, preferably, a, b and c are, respectively and independently, integers of 0 to 5. When d is 0, it is desirable that all of a, b and c are 1 or that a and b are 1 and c is 0.

Of the substituents represented by formula (A), those that are particularly desirable are tris(trimethylsiloxy)silyl groups, bis(trimethylsiloxy)methylsilyl groups, polydimethylsiloxane groups, polymethylsiloxane groups and poly-co-methylsiloxane-dimethylsiloxane groups.

X is polymerizable groups having carbon-carbon unsaturated bonds. Specific examples can include groups represented by formulas (x1) to (x7) below, and of these, the most desirable are groups represented by formulas (x1), (x2) and (x7):

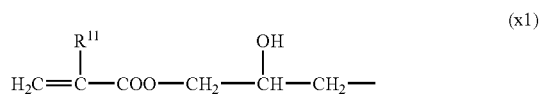

(x1)

(x2)

(x3)

(x4)

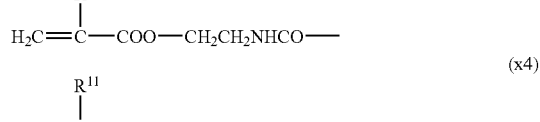

(x5)

(x6)

(x7)

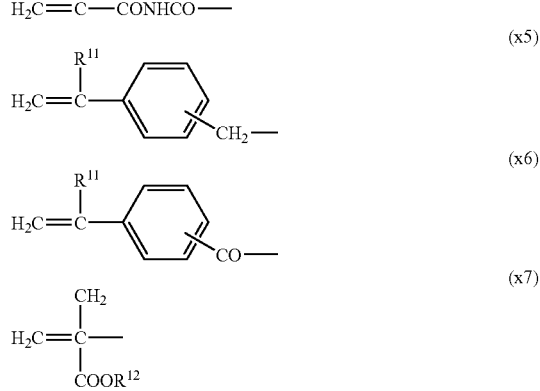

wherein, in formulas (x1) to (x7), $R^{11}$ is H or a methyl group, and $R^{12}$ is a substituent selected from alkyl groups that may be substituted and aryl groups that may be substituted.

In formulas (x1) to (x7), $R^{11}$ is H or a methyl group. $R^{12}$ is a substituent selected from alkyl groups that may be substituted and aryl groups that may be substituted. Desirable alkyl groups of 1 to 8 carbon atoms that may be substituted include methyl groups, ethyl groups, propyl groups, isopropyl groups, butyl groups, 2-hydroxyethyl groups, 3-hydroxypropyl groups, 4-hydroxybutyl groups, 2-methoxyethyl groups, 3-methoxypropyl groups, 4-methoxybutyl groups, 2-ethoxyethyl groups, 3-ethoxypropyl groups, 4-ethoxybutyl groups, 2-(2-methoxyethoxy)ethyl groups and 2-(2-ethoxyethoxy)ethyl groups. Phenyl groups and 4-methoxyphenyl groups are desirable as the aryl groups that may be substituted.

In formula (B), L is a divalent group of 1 to 10 carbon atoms, and

—CH$_2$—

—CH$_2$CH$_2$CH$_2$—

—CH$_2$CH$_2$OCH$_2$CH$_2$CH$_2$— are preferable.

Z is a substituent selected from O, S and N—Y.

Y is a substituent selected from the group consisting of H, alkyl groups that may be substituted and aryl groups that may be substituted. Desirable examples include H, methyl groups, ethyl groups, propyl groups, butyl groups, isobutyl groups, hexyl groups, octyl groups, 2-ethylhexyl groups, allyl groups, 2-hydroxyethyl groups, 3-hydroxypropyl groups, 2,3-dihydroxypropyl groups, 4-hydroxybutyl groups, 2-(2-hydroxyethoxy)ethyl groups, 2-methoxyethyl groups, 3-methoxypropyl groups, 4-methoxybutyl groups, 2-(2-methoxyethoxy)ethyl groups, furfuryl groups, tetrahydrofurfuryl groups, methoxycarbonylmethyl groups, ethoxycarbonylmethyl groups, propoxycarbonylmethyl groups, methoxyethoxycarbonylmethyl groups, ethoxyethoxycarbonylmethyl groups, methoxyethoxyethoxycarbonylmethyl groups, ethoxyethoxyethoxycarbonylmethyl groups, methoxycarbonylethyl groups, ethoxycarbonylethyl groups, propoxycarbonylethyl groups, methoxyethoxycarbonylethyl groups, ethoxyethoxycarbonylethyl groups, methoxyethoxyethoxycarbonyl ethyl groups, ethoxyethoxyethoxycarbonylethyl groups, methoxycarbonylpropyl groups, ethoxycarbonylpropyl groups, propoxycarbonylpropyl groups, methoxyethoxycarbonylpropyl groups, ethoxyethoxycarbonyl propyl groups, methoxyethoxyethoxycarbonylpropyl groups, ethoxyethoxyethoxycarbonylpropyl groups, phenyl groups, naphthyl groups, pyridyl groups, 4-methoxyphenyl groups, 2-methoxyphenyl groups, 4-hydroxyphenyl groups and 2-hydroxyphenyl groups.

Of the siloxanyl monomers represented by formula (B), those compounds represented by formulas (B1) to (B42) below are particularly desirable.

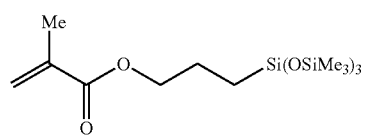

(B1)

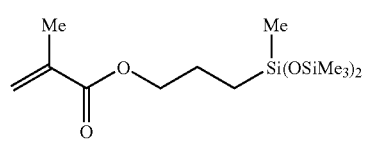

(B2)

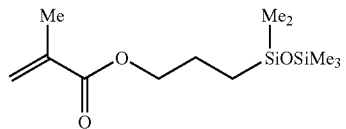

(B3)

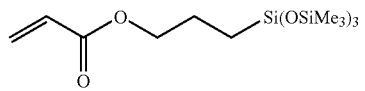

(B4)

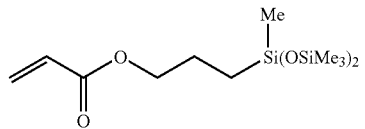

(B5)

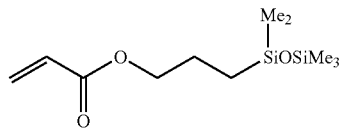

(B6)

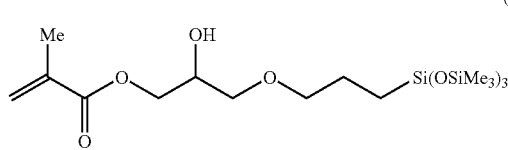

(B7)

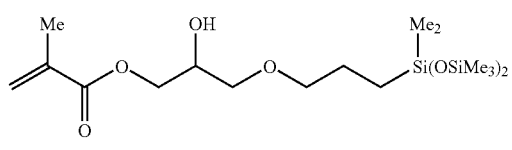

(B8)

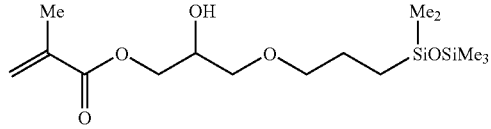

(B9)

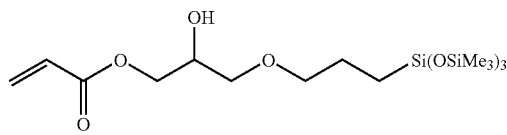

(B10)

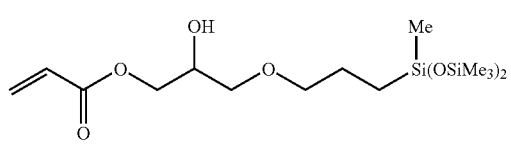

(B11)

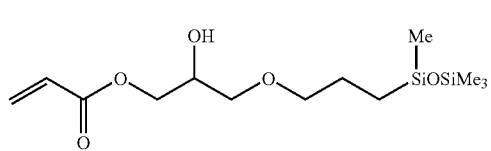

(B12)

-continued
(B13) 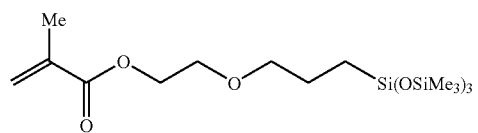
(B14) 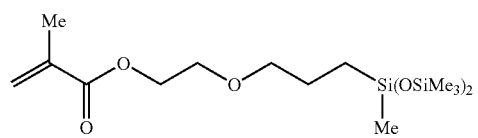
(B15) 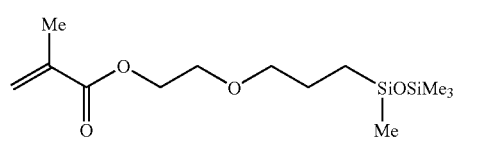
(B16) 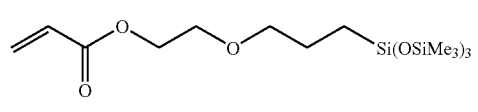
(B17) 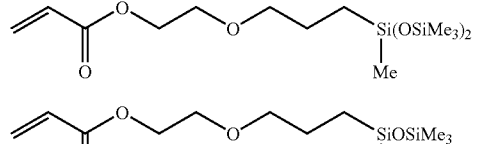
(B18) 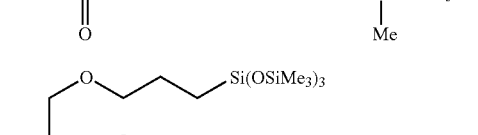
(B19) 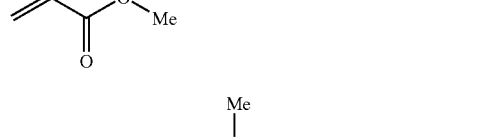
(B20) 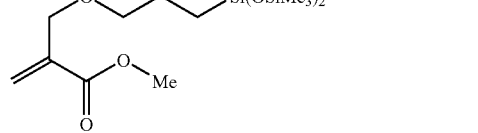
(B21) 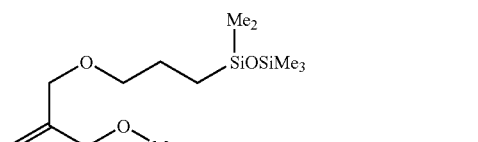
(B22) 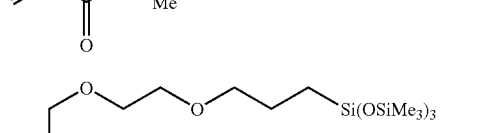
(B23) 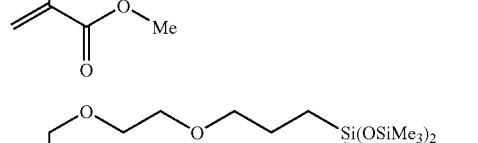
-continued
(B24) 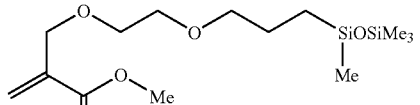
(B25) 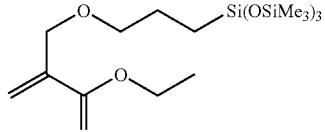
(B26) 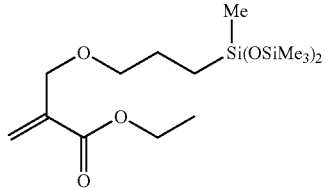
(B27) 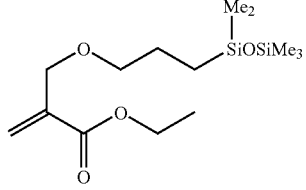
(B28) 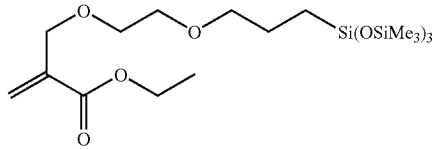
(B29) 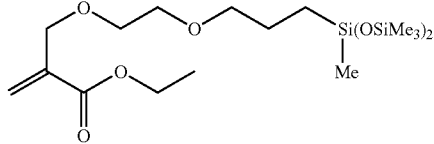
(B30) 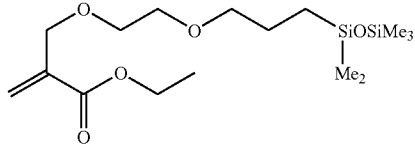
(B31) 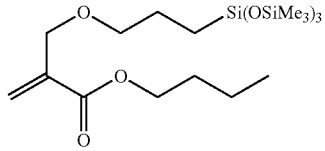
(B32) 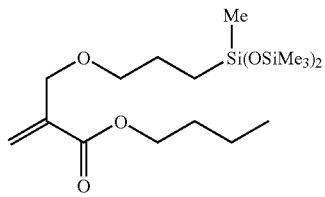

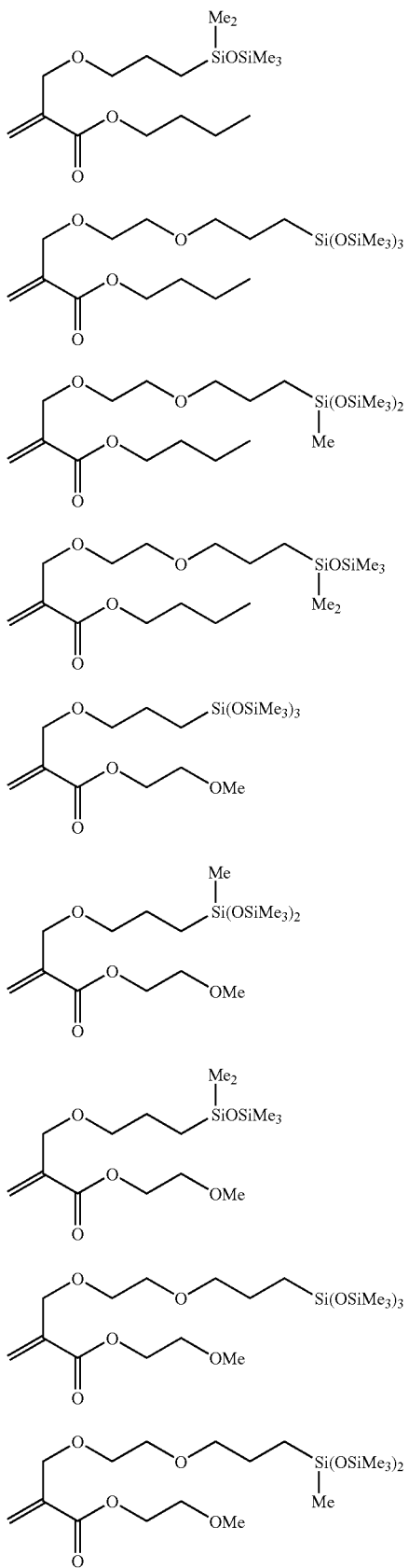

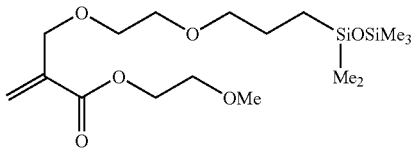

Desirable siloxanyl styrene compounds include [tris(trimethylsiloxy)silyl]styrene, [bis(trimehtylsiloxy)methylsilyl]styrene and [(trimethylsiloxy)dimethylsilyl]styrene.

For the purpose of obtaining good mechanical properties and of obtaining good resistance to disinfecting solutions and washing solutions, it is desirable that the ophthalmic lenses of this invention contain monomers having two or more polymerizable carbon-carbon unsaturated bonds in one molecule as copolymerization components. The copolymerization ratio of monomers having two or more polymerizable carbon-carbon unsaturated bonds in one molecule should be 0.1 weight % or greater. Here, weight % is the value calculated taking the total weight of the monomer composition (excluding the solvent component) as 100. The same applies hereafter.

The polymerization ratio of monomer of formula (a) in the ophthalmic lens of this invention should be in the range of 1 weight % to 100 weight %, and, preferably, of 5 weight % to 100 weight %. When it is copolymerized with a siloxanyl monomer, from the standpoint of assuring high oxygen permeability, the ratio for the monomer of formula (a) should be 1 weight % to 80 weight % and that for the siloxanyl monomer should be 20 weight % to 99 weight %. Preferably, that for the monomer of formula (a) should be 5 weight % to 50 weight % and that for the siloxanyl monomer should be 50 weight % to 95 weight %.

In order to facilitate polymerization when the ophthalmic lenses of this invention are obtained, the addition of thermal polymerization initiators and photopolymerization initiators of which peroxides and azo compounds are representative is desirable. When thermal polymerization is performed, a substance having optimum decomposition characteristics at the desired reaction temperature is selected and used. In general, azo initiators and peroxide initiators having 10 hour half-life temperatures of 40 to 120° C. are suitable. Carbonyl compounds, peroxides, azo compounds, sulfur compounds, halogen compounds and metal salts can be cited as photopolymerization initiators. These polymerization initiators can be used individually or in mixtures and are used in quantities up to about 1 weight %.

A polymerization solvent can be used when the ophthalmic lenses of this invention are obtained. Various organic and inorganic solvents can be used as the solvents and there are no particular limitations on them. Examples that can be cited include water; alcohol solvents such as methyl alcohol, ethyl alcohol, normal propyl alcohol, isopropyl alcohol, normal butyl alcohol, isobutyl alcohol and tert-butyl alcohol; glycol ether solvents such as methyl cellosolve, ethyl cellosolve, isopropyl cellosolve, butyl cellosolve, propylene glycol monomethyl ether, ethylene glycol dimethyl ether, diethylene glycol dimethyl ether and triethylene glycol dimethyl ether; ester solvents such as ethyl acetate, butyl acetate, amyl acetate, ethyl lactate and methyl benzoate; aliphatic hydrocarbon solvents such as normal hexane, normal heptane and normal octane; alicyclic hydrocarbon solvents such as cyclohexane and ethyl cyclohexane; ketone solvents such as acetone, methyl ethyl ketone and methyl isobutyl ketone; aromatic hydrocarbon solvents such as benzene, toluene and xylene; and petroleum solvents. They can be used individually or in mixtures.

Known polymerization methods and molding methods can be used as the methods in obtaining the ophthalmic lenses of this invention. For example, there is a method in which they are polymerized and molded into rods or plates and are then processed to the desired shapes by cutting and processing. There are also a mold polymerization method and a spin cast polymerization method.

As an example, we shall now describe the case in which the ophthalmic lens of this invention is obtained by the mold polymerization method.

The monomer composition is filled into the space of two molds having a fixed shape. Photopolymerization or thermal polymerization is performed and it is formed to the shape of the mold. The mold can be made of resin, glass, ceramics or metal. In the case of photopolymerization, a material that is optically transparent is used, and, ordinarily, resin or glass is used. In many cases, when an ophthalmic lens is manufactured, a space is formed by the two opposing molds and the space is filled with the monomer composition. Depending on the shape of the mold and the properties of the monomer, a gasket may be used for the purpose of conferring a fixed thickness on the ophthalmic lens and of preventing leakage of the filled monomer composition solution. The space of which the monomer composition is filled is then irradiated with active light rays such as ultraviolet rays or is introduced into an oven or water bath or oil bath and is heated and polymerized. The two methods can also be used in combination, with thermal polymerization being performed after photopolymerization, or, conversely, it can be photopolymerization being performed after thermal polymerization. In the case of photopolymerization, for example, light containing a large quantity of ultraviolet rays is usually irradiated for a short time (ordinarily 1 hour or less) using a mercury lamp or an insect attraction lamp. When thermal polymerization is performed, the temperature is gradually raised from close to room temperature to a temperature of 60° C. to 200° C. over a period of several hours to several tens of hours. These conditions are desirable for the purpose of maintaining the optical homogeneity and quality of the ophthalmic lens and of increasing reproducibility.

The ophthalmic lenses of this invention can be subjected to modification treatments by various methods for the purpose of increasing water content, increasing surface wettability and decreasing the modulus of elasticity.

Specific modification methods of the ophthalmic lenses of this invention can include electromagnetic wave (including light) irradiation, plasma irradiation, chemical vapor deposition treatments such as vaporization and sputtering, heating and boiling treatments, treatment with bases, treatment with acids, the use of other suitable surface treatment agents and combinations of these treatments. Of these modification procedures, treatment with bases and boiling treatment are desirable because they are simple.

We shall now describe the treatment with bases.

Examples of treatments with bases that can be cited include a method in which the ophthalmic lens is brought into contact with a basic solution and a method in which the ophthalmic lens is brought into contact with a basic gas. More specific examples of these methods include, for example, methods in which the ophthalmic lens is immersed in a basic solution, methods in which a basic solution or basic gas is sprayed at the ophthalmic lens, methods in which the basic solution is applied to the ophthalmic lens with a spatula or brush and methods in which the basic solution is applied to the ophthalmic lens by a spin coating method or a dip coating method. The method whereby great modifying effects can be obtained the most easily is the method in which the ophthalmic lens is immersed in the basic solution.

There are no particular limitations on temperature when the ophthalmic lens is immersed in the basic solution. However, the procedure is usually performed in a temperature range of −50° C. to 300° C. When workability is considered, a temperature range of −10° C. to 150° C. is preferable and −5° C. to 60° C. is more preferable.

The optimum period for immersion of the ophthalmic lens in the basic solution varies depending on the temperature. In general, a period of up to 100 hours is desirable, a period of up to 24 hours is more preferable and a period of up to 12 hours is most preferable. When the contact time is too long, workability and productivity deteriorate and there are instances in which there are deleterious effects such as a decrease of oxygen permeability and a decrease of mechanical properties.

The bases that can be used include alkali metal hydroxides, alkaline earth metal hydroxides, various carbonates, various borates, various phosphates, ammonia, various ammonium salts and various amines.

Various inorganic and organic solvents can be used as solvents of the basic solution. For example, they can include water; various alcohols such as methanol, ethanol, propanol, 2-propanol, butanol, ethylene glycol, diethylene glycol, triethylene glycol, tetraethylene glycol, polyethylene glycol and glycerol; various aromatic hydrocarbons such as benzene, toluene and xylene; various aliphatic hydrocarbons such as hexane, heptane, octane, decane, petroleum ether, kerosene, ligroin and paraffin; various ketones such as acetone, methyl ethyl ketone and methyl isobutyl ketone; various esters such as ethyl acetate, butyl acetate, methyl benzoate and dioctyl phthalate; various ethers such as diethyl ether, tetrahydrofuran, dioxane, ethylene glycol dialkyl ether, diethylene glycol dialkyl ether, triethylene glycol dialkyl ether, tetraethylene glycol dialkyl ether and polyethylene glycol dialkyl ether; various nonprotonic polar solvents such as dimethylformamide, dimethylacetamide, N-methyl-2-pyrrolidone, dimethylimidazolidinone, hexamethyl phosphoric triamide and dimethyl sulfoxide; halogen solvents such as methylene chloride, chloroform, dichloroethane trichloroethane and trichloroethylene; and freon solvents. Of these, water is the most desirable from the standpoints of economic factors, convenience of handling and chemical stability. These solvents can also be used in mixtures of two or more.

The basic solutions that are used in the treatment with bases may also contain components other than the basic substances and the solvents.

After the ophthalmic lens of this invention has been subjected to base treatment, the basic substance can be removed by washing. Various inorganic and organic solvents can be used as washing solvents. For example, they can include water; various alcohols such as methanol, ethanol, propanol, 2-propanol, butanol, ethylene glycol, diethylene glycol, triethylene glycol, tetraethylene glycol, polyethylene glycol and glycerol; various aromatic hydrocarbons such as benzene, toluene and xylene; various aliphatic hydrocarbons such as hexane, heptane, octane, decane, petroleum ether, kerosene, ligroin and paraffin; various ketones such as acetone, methyl ethyl ketone and methyl isobutyl ketone; various esters such as ethyl acetate, butyl acetate, methyl benzoate and dioctyl phthalate; various ethers such as diethyl ether, tetrahydrofuran, dioxane, ethylene glycol dialkyl ether, diethylene glycol dialkyl ether, triethylene glycol dialkyl ether, tetraethylene glycol dialkyl ether and polyethylene glycol dialkyl ether; various nonprotonic polar solvents such as dimethylformamide, dimethylacetamide, N-methyl-2-pyrrolidone, dimethylimidazolidinone, hexamethyl phosphoric triamide and dimethyl sulfoxide; halogen solvents such as methylene chloride, chloroform, dichloroethane trichloroethane and trichloroethylene; and freon solvents. Mixtures of two or more of these solvents can be used as the washing solvent. The washing solvent may contain components other than the solvents, for example, inorganic salts, surfactants and detergents.

We shall now describe the boiling treatment.

The boiling treatment is a method in which the ophthalmic lens of this invention is immersed in water or various types of aqueous solutions and they are heated to temperatures on the order of 80° C. to 200° C. Heating at temperatures greater than 100° C. is possible using an autoclave. The optimum period during which the ophthalmic lens is subjected to boiling treatment varies depending on the temperature. In general, a period of up to 100 hours is desirable, a period of up to 24 hours is more desirable and a period of up to 12 hours is most desirable. When the boiling treatment time is too long, workability and productivity deteriorate and there are instances in which such deleterious effects as decrease in mechanical properties occurs.

The aqueous solution that is used in the boiling treatment can be a pH buffer solution or a protein aqueous solution. A pH buffer solution having weak alkalinity is preferable.

The ophthalmic lens of this invention is characterized in that it has a high tensile elongation. Specifically, the tensile elongation should be greater than 50%, and, preferably, greater than 100%. When the tensile elongation is small, the ophthalmic lens readily tends to break. This is not desirable.

The ophthalmic lenses of this invention are suitable for use as contact lenses, intraocular lenses and artificial corneas. Of these, they are most suitable for use as contact lenses.

EXAMPLES

We shall now describe this invention in specific terms by means of examples. However, this invention is not limited by them.

Determination Methods

Determination of tensile elongation in these examples was performed by the method described below.

A sample [width (minimum part), 5 mm; length, 14 mm; thickness, on the order of 0.2 mm] cut from a substance in the contact lens shape using a specified punch mold was used and determination was performed using a Model RTM-100 Tensilon manufactured by Orientec Corporation. The drawing speed was set to 100 mm/min and the distance between grips was set to 5 mm. The sample was drawn until it broke and the elongation ratio at the time of breaking was found.

Synthesis 1

Synthesis of N-(2-methoxyethyl)acrylamide

2-Methoxyethylamine (44.6 g), ethyl acetate (100 mL) and triethylamine (50.6 g) were introduced into a 300 mL flask equipped with a dropping funnel and a magnetic stirrer. The flask was immersed in an ice bath and the contents of the flask were stirred as nitrogen gas was being introduced. Acryloyl chloride (45.3 g) was introduced into the dropping funnel and was added dropwise over a period of approximately one hour. After the dropwise addition was completed, stirring was continued for 1 hour at room temperature. The salt, which was separated out by suction filtration using celite, was separated by filtration, after which low boiling point components were removed with a rotary vacuum evaporator. Purification was performed by distillation under reduced pressure and N-(2-methoxyethyl)acrylamide was obtained as a colorless transparent liquid.

Synthesis 2

Synthesis of N-(3-methoxypropyl)acrylamide

N-(3-methoxypropyl)acrylamide was obtained as a colorless transparent liquid in the same way as in Synthesis 1 except that 3-methoxypropylamine was used instead of 2-methoxyethylamine.

Synthesis 3

Synthesis of N-[2-(2-methoxyethoxy)ethyl]acrylamide (1) Chlorotrimethylsilane (108.6 g), hexamethyldisilazane (161.4 g) and tetrahydrofuran (400 mL) were introduced into a 2 L four-neck flask equipped with a dropping funnel and a stirring blade. The flask was immersed in an ice bath and the contents of the flask were stirred as nitrogen gas was being introduced. 2-(2-aminoethoxy)ethanol (210.3 g) was introduced into the dropping funnel and was added dropwise over a period of approximately one hour. After the dropwise addition was completed, stirring was continued for 4 hours at room temperature. The salt, which was separated out by suction filtration using celite, was separated by filtration, after which low boiling point components were removed with a rotary vacuum evaporator. Purification was performed by distillation under reduced pressure and a compound indicated by formula (J1) was obtained as a colorless transparent liquid.

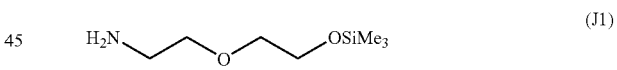

(2) The compound of formula (J1) (157.6 g), toluene (300 mL) and triethylamine (94.4 g) were introduced into a 2 L four-neck flask equipped with a dropping funnel and a stirring blade. The flask was immersed in an ice bath and the contents of the flask were stirred as nitrogen gas was being introduced. Acryloyl chloride (84.46 g) was introduced into the dropping funnel and was added dropwise over a period of approximately one hour. After the dropwise addition was completed, stirring was continued for 1 hour at room temperature. The salt, which was separated out by suction filtration using celite, was separated by filtration. 2,6-di-t-butyl-4-methylphenol (0.5 g) and 4-t-butyl catechol were added, after which low boiling point components were removed with a rotary vacuum evaporator (using a vacuum pump; bath temperature, 60° C.). Purification was performed by distillation under reduced pressure and N-[2-(2-trimethylsiloxyethoxy)ethyl]acrylamide was obtained as a colorless transparent liquid.

(3) N-[2-(2-trimethylsiloxyethoxy)ethyl]acrylamide (73.5 g), methanol (400 g) and acetic acid (50 g) were introduced into a 1 L eggplant type flask and were mixed to a homogeneous state, after which the mixture was allowed to stand at room temperature overnight. 2,6-di-t-butyl-4-methylphenol (0.2 g) was added, after which the solvent was removed by means of a rotary vacuum evaporator (using a vacuum pump; bath temperature, 60 to 70° C.). The volatile components were removed by means of a vacuum pump under decreased pressure over a two-hour period at 70° C. and N-[2-(2-hydroxyethoxy)ethyl]acrylamide was obtained as a yellow transparent, viscous liquid.

(4) N-[2-(2-hydroxyethoxy)ethyl]acrylamide (35.87 g), potassium hydroxide (15.2 g), tetrahydrofuran (100 g) and methyl iodide (33.58 g) were introduced into a 1 L eggplant type flask equipped with a reflux condenser and a magnetic rotor. A reaction was carried out at 45° C. for 2 hours and then for 2 hours at 60° C. as the mixture was being stirred. The salt that separated out was removed by filtration and the low boiling point components were removed by means of a rotary vacuum evaporator. Purification was performed by distillation under reduced pressure and N-[2-(2-methoxyethoxy)ethyl]acrylamide was obtained as a yellow transparent, viscous liquid.

Synthesis 4

Synthesis of Compound of Formula (S1)

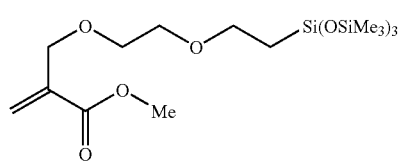

(S1)

(1) A compound of formula (J2) (100.0 g, manufactured by Nippon Shokubai Co., Ltd.)

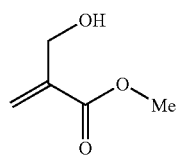

(J2)

and diethyl ether (500 mL) were introduced into a 1 L four-neck flask equipped with a dropping funnel and a stirring blade. The flask was immersed in an ice bath and the contents of the flask were stirred as nitrogen gas was being introduced. Phosphorus tribromide (107.6 g) was introduced into the dropping funnel and was added dropwise over a period of approximately 1.5 hours. After the dropwise addition was completed, stirring was continued for 3.5 hours at room temperature. The flask was again immersed in an ice bath and water (500 mL) was added. Extraction was performed with hexane using a separatory funnel. Anhydrous magnesium sulfate was added and dehydration was performed, after which the magnesium sulfate was removed by filtration. The solvent was removed by a rotary vacuum evaporator. Purification was performed by distillation under reduced pressure and a compound of formula (J3) was obtained as a colorless transparent liquid.

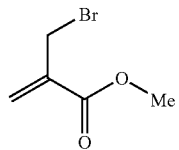

(J3)

(2) Ethylene glycol monoallyl ether (100 g), triethylamine (18.7 g) and 4-methoxyphenol (50 mg) were added to a 200 mL three-neck distillation flask equipped with a dropping funnel and a stirring blade. The flask was immersed in an ice bath and the contents of the flask were stirred with a motor. The compound of formula (J3) (30 g) was added dropwise over approximately 30 minutes. After the dropwise addition was completed, the reaction solution was heated for 24 hours at 100° C. The reaction solution was filtered and the precipitate was removed, after which extraction was performed with ethyl acetate. The extraction solution was washed with a saturated saline solution. Anhydrous magnesium sulfate was added and dehydration was performed, after which the magnesium sulfate was removed by filtration. The solvent was removed with a rotary vacuum evaporator. The liquid that was obtained was purified by distillation under reduced pressure and a compound of formula (J4) was obtained as a colorless transparent liquid.

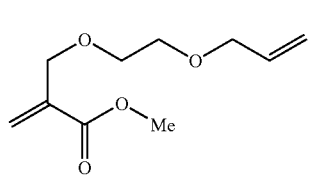

(J4)

(3) The compound of formula (J4) (17.0 g), toluene (65 mL), 2,6-di-t-butyl-4-methylphenol (18.7 mg) and chloroplatinic acid 6-hydride (44.0 mg) were introduced into a 200 mL eggplant type flask equipped with a dropping funnel and a magnetic rotor, and the mixture was stirred at room temperature. Trichlorosilane (11.5 g) was introduced into the dropping funnel and was added dropwise over approximately 30 minutes. After the dropwise addition was completed, a reaction was carried out for 7 hours at room temperature. The low boiling point components were removed with a rotary vacuum evaporator. The liquid that was obtained was purified by distillation under reduced pressure and a compound of formula (J5) was obtained as a colorless transparent liquid.

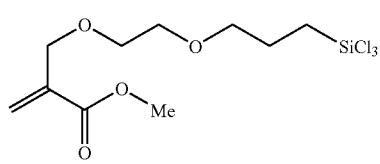

(J5)

(4) Hexane (20 g), methanol (20 g) and water (40 g) were introduced into a 300 mL three-neck distillation flask equipped with a dropping funnel and a stirring blade. The flask was immersed in an ice bath and the contents of the flask were stirred intensively with a motor. A mixture consisting of the compound of formula (J5) (15.4 g) and methoxytrimethylsilane (40 g) was added dropwise over approximately 0.5 hour. After the dropwise addition was completed, stirring was continued for 9.5 hours at room temperature. The reaction solution was separated into two layers and the top layer was collected with a separatory funnel. Washing was performed using an aqueous solution of saturated sodium hydrogencarbonate (3 times) and water (3 times) in that order. Dehydration was performed by means of anhydrous magnesium sulfate, after which the solvent was removed with a rotary vacuum evaporator. Purification was performed by distillation under reduced pressure. A compound of formula (S1) was obtained as a colorless transparent liquid.

Synthesis 5

Synthesis of Compound of Formula (S2)

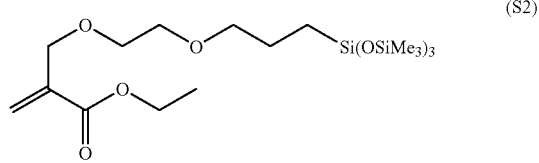

The preparation of compound of formula (S2) obtained as a colorless transparent liquid was performed in the same way as in Synthesis 4 except that a compound of formula (J6) (manufactured by Nippon Shokubai Co., Ltd.) was used instead of the compound of formula (J2).

Example 1

N-(2-methoxyethyl)acrylamide (see Synthesis 1, 10.8 parts by weight), N,N-dimethylacrylamide (21.7 parts by weight), the compound of formula (S1) (see Synthesis 4, 67.5 parts by weight), polyethylene glycol dimethacrylate ("PDE600," manufactured by NOF CORPORATION; 1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. This monomer composition was deaerated in an argon atmosphere. It was then poured into a contact lens mold made of a transparent resin (poly 4-methylpentene-1) in a glove box having a nitrogen atmosphere. It was irradiated with light (1 mW/cm², 10 minutes) and polymerized using an insect attraction lamp and a contact lens was obtained. The contact lens that was obtained was immersed in pure water for 24 hours at room temperature, after which it was immersed for 24 hours at room temperature in a 0.25 M aqueous solution of sodium hydroxide. Said contact lens was then washed with pure water, after which it was immersed in a boric acid buffer solution (pH 7.1 to 7.3) in a vial and the vial was hermetically sealed. Said vial was introduced into an autoclave and boiling treatment was performed for 30 minutes at 120° C. After cooling, the contact lens was removed from the vial and was washed with pure water, after which it was again immersed in a pure boric acid buffer solution (pH 7.1 to 7.3). When the tensile elongation of the contact lends that was obtained was measured, a high value of 480% was found and the lens did not readily break.

Example 2

A contact lens was obtained by polymerization and post-treatment in exactly the same way as in Example 1 except that N-(3-methoxypropyl)acrylamide (see Synthesis 2) was used instead of N-(2-methoxyethyl)acrylamide. When the tensile elongation of the sample that was obtained was determined, a high value of 510% was found and the lens did not readily break.

Example 3

N-methoxymethyl acrylamide (manufactured by KASANO KOSAN CORPORATION; 32.5 parts by weight), the compound of formula (S1) (see Synthesis 4, 67.5 parts by weight), polyethylene glycol dimethacrylate ("PDE600," manufactured by NOF CORPORATION; 1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. When the tensile elongation of the sample that was obtained was determined, a high value of 270% was found and the lens did not readily break.

Comparative Example 1

N,N-dimethyl acrylamide (32.5 parts by weight), the compound of formula (S1) (see Synthesis 4, 67.5 parts by weight), polyethylene glycol dimethacrylate ("PDE600," manufactured by NOF CORPORATION; 1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. Determination of the tensile elongation of the sample that was obtained was attempted. However, it was extremely fragile and broke during handling so that determination of tensile elongation was not possible. That is, it was found that the lens was very easily broken.

Example 4

N-[2-(2-methoxyethoxy)ethyl]acrylamide (see Synthesis 3, 10 parts by weight), N,N-dimethylacrylamide (20 parts by weight), the compound of formula (S2) (see Synthesis 5, 70 parts by weight), triethylene glycol dimethacrylate (1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. When the tensile elongation of the sample that was obtained was determined, a high value of 610% was found and the lens did not readily break.

Comparative Example 2

N-N-dimethyl acrylamide (30 parts by weight), the compound of formula (S2) (see Synthesis 4, 70 parts by weight), triethylene glycol dimethacrylate (1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. Determination of the tensile elongation of the sample that was obtained was attempted. However, it was extremely fragile and broke during handling so that determination of tensile elongation was not possible. It was found that the lens was very breakable.

Example 5

N-(2-methoxyethyl) acrylamide (see Synthesis 1, 10 parts by weight), N,N-dimethylacrylamide (20 parts by weight), the compound of formula (S1) (see Synthesis 5, 46.7 parts by weight), 3-acryloxypropyltris(trimethylsiloxy)silane (manufactured by Shin-Etsu Chemical Co., Ltd., 23.3 parts by weight), triethylene glycol dimethacrylate (1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. When the tensile elongation of the sample that was obtained was determined, a high value of 610% was found and the lens did not readily break.

Comparative Example 3

N-N-dimethyl acrylamide (30 parts by weight), the compound of formula (S1) (see Synthesis 5, 46.7 parts by weight), 3-acryloxypropyltris(trimethylsiloxy)silane (manufactured by Shin-Etsu Chemicals Co., Ltd., 23.3 parts by weight), triethylene glycol dimethacrylate (1 part by weight), diethylene glycol dimethyl ether (10 parts by weight) and the polymerization initiator "Darocure 1173" (manufactured by CIBA Specialty Chemicals Inc., 0.5 part by weight) were mixed to a homogeneous state and a monomer composition was obtained. A contact lens was obtained by polymerization and post-treatment in exactly the same way as in Example 1 using this monomer composition. When the tensile elongation of the sample that was obtained was determined, it was found to be a low value of 12% and the sample broke easily.

INDUSTRIAL APPLICABILITY

By means of this invention, ophthalmic lenses, in particular, contact lenses, of high tensile elongation (i.e., that do not break readily) are obtained.

The invention claimed is:

1. An ophthalmic lens comprising, as a polymerization component, monomers represented by formula (a) below:

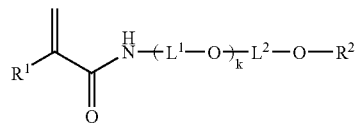

wherein, in formula (a), $R^1$ is H or a methyl group; $R^2$ is a group that is selected from alkyl groups with 1 to 8 carbon atoms, aralkyl groups with 7 to 12 carbon atoms and aryl groups with 6 to 10 carbon atoms; $L^1$ is a substituent that is selected from ethylene groups, 1,2-propylene groups, 1,3-propylene groups and 1,4-butylene groups; and $L^2$ is a substituent that is selected from methylene groups, and ethylene groups, and k is an integer of 0 to 2.

2. The ophthalmic lens of claim 1 wherein, refer to formula (a), $R^2$ is a methyl group or an ethyl group, k is an integer of 0 or 1, $L^1$ is an ethylene group.

3. The ophthalmic lens of claim 2 wherein $R^1$ in formula (a) is H.

4. The ophthalmic lens of claim 1 that further comprises the monomers of formula (a) and siloxanyl monomers as polymerization components.

5. The ophthalmic lens of claim 1 in which the ophthalmic lens is a contact lens.

6. An ophthalmic lens comprising, as a polymerization component, at least one monomer selected from the group consisting of N-methoxymethylacrylamide, N-ethoxymethylacrylamide, N-propoxymethylacrylamide, N-isopropoxymethylacrylamide, N-butoxymethylacrylamide, N-methoxymethylmethacrylamide, N-ethoxymethylmethacrylamide, N-propoxymethylmethacrylamide, N-isopropoxymethylmethacrylamide, N-butoxymethylmethacrylamide, N-(2-methoxyethyl) acrylamide, N-(2-ethoxyethyl) acrylamide, N-(2-propoxyethyl) acrylamide, N-(2-isopropoxyethyl) acrylamide, N-(2-butoxyethyl) acrylamide, N-(2-methoxyethyl) methacrylamide, N-(2-ethoxyethyl) methacrylamide, N-(2-propoxyethyl) methacrylamide, N-(2-isopropoxyethyl) methacrylamide, NB(2-butoxyethyl) methacrylamide, N-(3-methoxypropyl) acrylamide, N-(3-ethoxypropyl) acrylamide, N-(3-propoxypropyl) acrylamide, N-(3-isopropoxypropyl) acrylamide, N-(3-butoxypropyl) acrylamide, N-(3-methoxypropyl) methacrylamide, N-(3-ethoxypropyl) methacrylamide, N-(3-propoxypropyl) methacrylamide, N-(3-is opropoxypropyl) methacrylamide, N-(3-butoxypropyl) methacrylamide, N-[2-(2-methoxyethoxy)ethyl] acrylamide, N-[2-(2-ethoxyethoxy)ethyl] acrylamide, N-[2-(2-propoxyethoxy)ethyl] acrylamide, N-[2-(2-isopropoxyethoxy)ethyl] acrylamide, N-[2-(2-butoxyethoxy)ethyl] acrylamide, N-[2-(2-methoxyethoxy)ethyl] methacrylamide, N-[2-(2-ethoxyethoxy)ethyl] methacrylamide, N-[2-(2-propoxyethoxy)ethyl] methacrylamide, N-[2-(2-isopropoxyethoxy)ethyl] methacrylamide and N-[2-(2-butoxyethoxy)ethyl] methacrylamide.

7. The ophthalmic lens of claim 6 that further comprising at least one siloxanyl monomer as a polymerization component.

8. The ophthalmic lens of claim 6 in which the ophthalmic lens is a contact lens.

9. The ophthalmic lens of claim 4 wherein the polymerization components comprise about 1 weight % to 80 weight % of the monomers of formula (a) and about 20 weight % to 99 weight % of the siloxanyl monomers.

10. The ophthalmic lens of claim 4 wherein the polymerization components comprise about 5 weight % to 50 weight % of the monomers of formula (a) and about 50 weight % to 95 weight % of the siloxanyl monomers.

11. The ophthalmic lens of claim 7 wherein the polymerization components comprise about 1 weight % to 80 weight % of the monomers of formula (a) and about 20 weight % to 99 weight % of the siloxanyl monomers.

12. The ophthalmic lens of claim 7 wherein the polymerization components comprise about 5 weight % to 50 weight % of the monomers of formula (a) and about 50 weight % to 95 weight % of the siloxanyl monomers.

* * * * *